United States Patent [19]

McCorkle

[11] Patent Number: 5,019,825

[45] Date of Patent: May 28, 1991

[54] COHERENTLY INTERRUPTIBLE FREQUENCY HOPPED CHIRP GENERATOR

[75] Inventor: John McCorkle, College Park, Md.

[73] Assignee: The United States of America as represented by the Secretary of the Army, Washington, D.C.

[21] Appl. No.: 440,944

[22] Filed: Nov. 24, 1989

[51] Int. Cl.$^5$ ............................................. G01S 13/522
[52] U.S. Cl. ...................................... 342/201; 342/204
[58] Field of Search ........................ 342/201, 202, 204; 307/106

[56] References Cited

U.S. PATENT DOCUMENTS

| | | | |
|---|---|---|---|
| 3,344,426 | 9/1967 | Long | 342/157 |
| 4,123,719 | 10/1978 | Hopwood et al. | 342/155 |
| 4,309,703 | 1/1982 | Blahut | 342/201 |
| 4,739,186 | 4/1988 | Crookshanks | 307/106 |
| 4,853,701 | 8/1989 | Drabowitch | 342/139 |
| 4,866,446 | 9/1989 | Hellsten | 342/25 |
| 4,875,050 | 10/1989 | Rathi | 342/195 |

Primary Examiner—John B. Sotomayor
Attorney, Agent, or Firm—Saul Elbaum; Guy M. Miller

[57] ABSTRACT

A coherently interruptible frequency hopped chirp waveform generator has a signal generating synthesizer and a chirp generator with digitally stored chirp samples in which both are phase locked to a reference clock and responsive to a timing and control circuit. The digitally stored chirp signal sample is D/A converted and mixed with a fixed frequency signal generated by the synthesizer forming translated chirp signals. The translated chirp signals are output, being controlled by a timing and control circuit so that a plurality of coherently interruptible and frequency selectable chirp subpulses are formed.

12 Claims, 2 Drawing Sheets

COHERENTLY INTERRUPTIBLE FREQUENCY HOPPED CHIRP GENERATOR

RIGHTS OF THE GOVERNMENT

The invention described herein may be manufactured, used and licensed by or for the United States Government for Governmental purposes without payment to me of any royalty thereon.

BACKGROUND OF THE INVENTION

1. Field of the Invention

The present invention relates to the generation of chirp signals for use in pulse compression sensors such as radars and sonars and, more particularly, to an ultra-linear chirp generating scheme that generates a plurality of coherently interruptible and frequency selectable chirp sub-pulses over a broad bandwidth.

2. Description of the Prior Art

Pulse compression is presently being used in a variety of radar and sonar systems to detect missiles, aircraft, ground vehicles and people, ships, submarines, and faults in various materials like cast metals. A problem with pulse compression is that desirable high compression ratios require long pulses. But applications that require detection of close-range targets must use short pulses. These applications, therefore, cannot take full advantage of high compression chirp waveforms. If a means were available to break a chirp into sub-sections, with the phase, frequency, and frequency-rate precisely controlled at the break points, then more of these applications could be implemented with high compression ratios. Ideally, the ultimate resolution of the compressed pulse is a function of its total bandwidth. But, in practice, as the bandwidth is increased, the chirp linearity becomes the limiting factor. Also, the price skyrockets while the reliability and maintainability becomes poorer. If a means were available to reliably generate wide bandwidth highly linear chirps with simple hardware, then products could be made with higher performance (both in terms of resolution and in terms of reliability) and with lower cost.

A chirp is defined mathematically as $\sin(\omega t + \psi t^2)$ where $\psi$ is the ramp rate in radians per second per second. Common methods for generating chirp signals include; (1) feeding a ramping voltage into a voltage controlled oscillator (VCO) without feedback; (2) using a delay-line/mixer/reference to provide feedback to (1); (3) using a reference and an impulse sampler to provide feedback to (1); (4) adding memory to (2) or (3) such that the error voltages can be stored on a pulse to pulse basis and thus improve the linearity, and; (5) direct playback of a digitally stored chirp signal. These first four techniques have limited linearity, cannot be coherently started and stopped, and are limited in bandwidth by the linear region of VCO operation. Complex circuits with critical/sensitive parts and adjustments result as attested by methods 2, 3, and 4 being used to correct problems. Method 5 is severely limited in bandwidth since a digital-to-analog (D/A) converter must run at about three times the highest desired output frequency in practical systems. Thus, for example, a high speed 200 MHz D/A converter would provide only a 66 MHz chirp, yet would require a very tight filter specification. The filter would have to both reject the digital harmonics and be flat enough through 66 MHz to maintain the linearity of the chirp. Consequently, it is desirable to have a chirp generator that exhibits high linearity, can be coherently started, stopped and restarted at various frequencies, has respectable bandwidth, and can be economically manufactured.

SUMMARY OF THE INVENTION

It is therefore an object of the invention to provide a technique for generating chirp pulses that exhibit high linearity.

It is a further object of the invention to provide a technique for generating chirp pulses that can be coherently started and stopped at selectable frequencies.

It is a still further object of the invention to provide a technique for generating chirp pulses that is inexpensive to manufacture, reliable and with nothing to trim.

The foregoing and other objects are attained in accordance with the invention by generating a chirp waveform that is based on the property that zero crossings of a linearly chirped signal occur at fixed intervals. Instead of sending a single chirp covering the entire bandwidth, the new waveform is designed to "interrupt" the chirp at zero crossings and sends only part of the chirp on a sub-pulse, yet over several translated sub-pulses the entire chirp's bandwidth is sent. The general mathematical relation is given as follows:

$$s(t) = A_j \sin(\omega_j(t-B_j) + \psi(t-B_j)^2); T_j < t < T_{j+1} \qquad (1)$$

where s(t) is the outputted translated chirp signal, j counts sub-pulses, $A_j$ is the amplitude of the $j^{th}$ sub-pulse, $\psi$ is ramp rate in radians per second per second, $T_{inc} = \pi/\psi$ is the time between zero crossings, $m_j$ is an arbitrary set of integers, $\omega_j = 2\pi m_j/T_{inc}$ is the radian frequency of the $j^{th}$ sub pulse, t is time in seconds, $i_j$ is an arbitrary set of integers, $T_j = i_j \cdot T_{inc}$, $n_j$ is an arbitrary set of integers, and $B_j = n_j \cdot T_{inc}$. The ability to output relatively narrow bandwidth sub-pulses makes the chirp generator easier to build and more reliable than generators that must cover the entire bandwidth in one continuous chirp pulse.

These chirp sub-pulses can be generated by combining a phase locked synthesizer with a direct digital chirp generator to which each is phase locked to a reference clock. The signals generated by the synthesizer are mixed with the analog output of the digitally stored chirp signals to form translated chirp signals which can then be outputted in the form of a plurality of coherently interruptible and frequency selectable chirp sub-pulses.

The foregoing and other objects and advantages of the invention will appear from the following description. In the description reference is made to the accompanying drawings which form a part hereof, and in which there is shown by way of illustration and not of limitation a preferred embodiment. Such description does not represent the full extent of the invention, but rather the invention may be employed in different arrangements according to the breadth of the invention.

DESCRIPTION OF THE PREFERRED EMBODIMENTS

Figure 1:
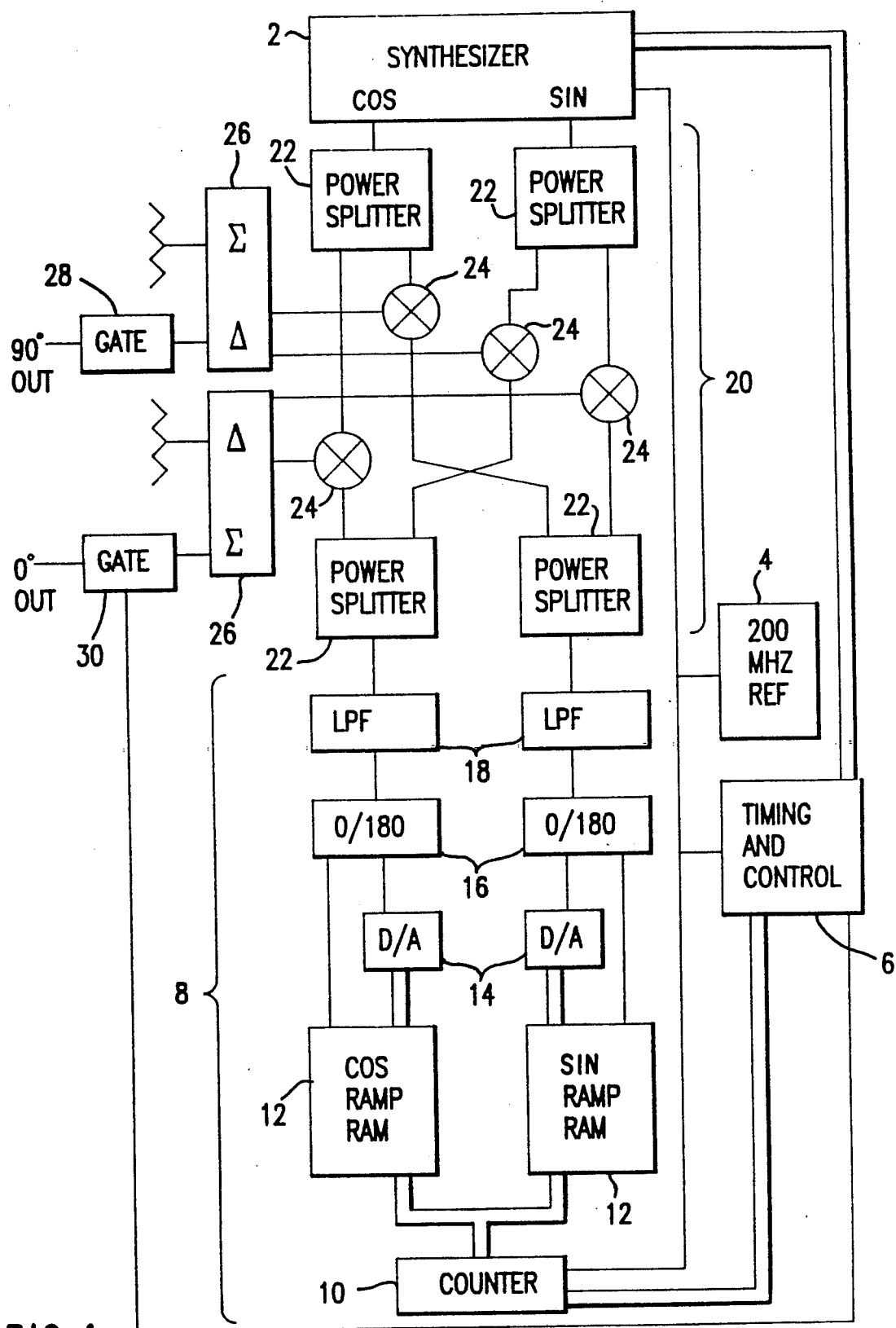
FIG. 1 shows an electrical circuit in block diagram form of a coherently interruptible frequency hoped chirp waveform network according to an aspect of the invention.

Referring now to the drawings, like reference numerals represent identical or corresponding parts throughout the several views.

A preferred embodiment of a frequency hopped chirp waveform network is shown in FIG. 1 and comprises a phase locked synthesizer 2 connected to a reference clock 4 and a timing and control circuit 6. A digital chirp generator 8, also connected to the reference clock 4 and timing and control circuit 6, includes a counter 10, memory (RAM) 12, digital-to-analog converters 14, phase shifters 16 and low pass filters 18. A mixing circuit 20 includes power splitters 22, mixers 24, and hybrid couplers 26. The mixing circuit 20 responds to the synthesizer 2 and chirp generator 8 forming translated chirp signals which are outputted by gates 28 and 30. All of the above devices have been used in one form or another and are well known in the art of chirp generation.

The operation of the network shown in FIG. 1 is as follows. Quadrature amplitude samples of a chirp waveform, stored in digital memory 12, are played back via two digital-to-analog converters 14 under the control of an accurate reference clock 4. The use of phase shifters 16 with the digital-to-analog converters 14 gives an extra bit of resolution. For example, nine bits of resolution can be achieved using eight bit digital-to-analog converters. The resulting quadrature signals are mixed with quadrature signals from the fixed frequency synthesizer 2. The resulting signals are combined in a network of mixers 24 and hybrid couplers 26 forming translated chirp signals. The fixed frequency signal generated by the synthesizer 2, and the chirp signal generated by the digital chirp generator 8, are phase locked to the reference clock 4 so that both the digital-to-analog generated chirp signal and the synthesizer generated fixed frequency signal can be stopped and started at precisely the same phase point, mutual zero crossings, as determined by the timing and control circuit 6, which is also locked to the reference clock 4. The timing and control circuit 6 controls the output gates 28 and 30 so that translated chirp signals can be outputted in the form of a plurality of coherently interruptible and frequency selectable chirp subpulses. Furthermore, during an interruption, the synthesizer frequency can be changed and the read-point in digital memory can be changed (e.g. back to zero) so that the phase, frequency and frequency-rate at sub-pulse start-up matches the phase, frequency and frequency-rate when a different chirp sub-pulse is interrupted.

With even greater specificity this invention relates to chirp generating schemes that can produce coherent interruptions and coherent hops in frequency.

Mathematically, $\sin(2\pi ft + 2\pi Kt^2) = 0$ when $2ft$ is an integer and when $2Kt^2$ is an integer, where: f is in Hertz; K is in Hertz per second; and t is in seconds. Define $T_{inc}$ to represent seconds between zero-crossings of the chirp signal. If f is restricted to $f = m/T_{inc}$: $m = 0, 1, 2, 3 \ldots$, then $$T_{inc} = 1/\sqrt{2K}.$$

This invention implements a chirp generator that locks both K and f to the common reference clock 4. Mathematically, the synthesizer 2 generates the $\sin(2\pi ft)$ term, and the $\sin(2\pi Kt^2)$ term is stored in memory 12 and played back through a digital-to-analog converter 14. An important property is that the segment of the chirp stored in memory 12 can be "re-referenced" to $t=0$ by noting that $$\sin(2\pi f_1 t + 2\pi Kt^2)|_{f_1 = i/T_{inc}, mT_{inc} < t < nT_{inc}} = \sin(2\pi f_2 t + 2\pi Kt^2)|_{f_2 = (i+m)T_{inc}, 0 < t < (n-m)T_{inc}} \quad (2)$$

where i, m, and n are integers. This property is used when the digitally produced $\sin(2\pi Kt^2)$ term frequency becomes higher than the digital hardware will reliably operate. When the frequency becomes to high, the output can be interrupted, f can be incremented from $f = i/T_{inc}$ to $f = (i+m)/T_{inc}$ while the pointer into the memory 12 is reset to zero. This technique allows extremely wide bandwidth chirps to be generated because the ultimate bandwidth is not determined by the digital-to-analog converters 14, but by the frequency range of the synthesizer 2. At the same time, ultra-linear chirps are generated because the chirp rate, df/dt, is crystal controlled via chirp playback through the digital-to-analog convertors 14. Indeed, pre-distorted chirp segments can be stored in memory 12 to precisely cancel errors in other components (such a the phase shifters 16, the low pass filters 18, the mixing circuit 20, the output gates 28 and 30, and other components in the specific system) such that an ultra-linear chirp results.

Figure 2:
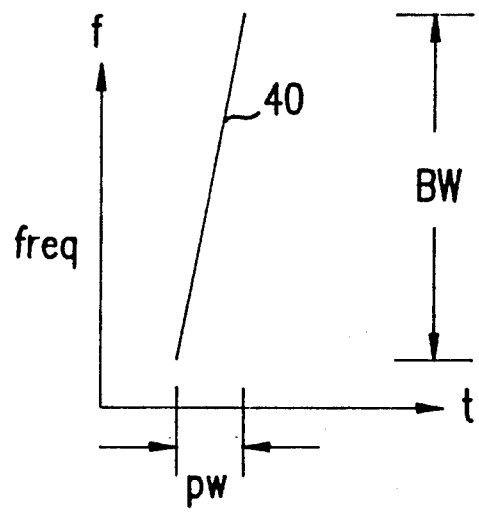
FIG. 2 shows a typical chirp waveform plotted as frequency vs. time with a set pulse width and bandwidth.
Figure 3:
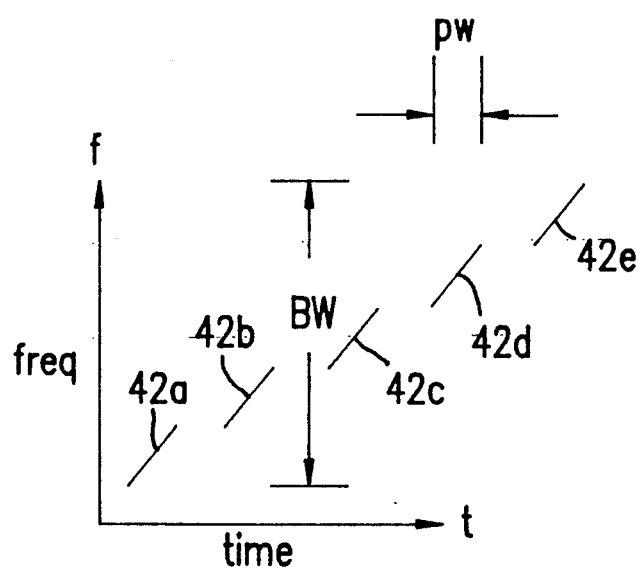
FIG. 3 shows a first variation of outputted chirp sub-pulses generated by the coherently interruptible frequency hopped chirp waveform network of FIG. 1.

To better appreciate the type of signal that can be outputted using the network shown in FIG. 1, a representation of these signals are compared with a typical prior art chirp pulse. In FIG. 2 a representation of a typical chirp pulse 40 is shown having a pulse width pw covering a bandwidth BW. When this chirp pulse is transmitted the entire pulse is transmitted as a single pulse and therefore must cover the bandwidth BW in a short period of time in order to stay within pulse width pw constraints. In contrast, the chirp pulses generated by the network in FIG. 1, as shown in FIG. 3, can take the form of a plurality of chirp sub-pulses 42a through 42e in which after an interruption takes place the phase and frequency of the next sub-pulse at start-up is matched to the phase and frequency of the previous chirp sub-pulse at interruption. Each sub-pulse has a pulse width pw but it takes the entire group of subpulses 42a through 42e to cover the entire bandwidth BW. From equation (1), for example, the first three subpulses in FIG. 3 can be represented mathematically as;

$$\begin{aligned}
s(t) &= \sin(\omega t + \psi t^2); & 0 < t < T_1 \\
&= 0; & T_1 < t < T_2 \\
&= \sin(\omega(t - T_2 + T_1) + \psi(t - T_2 + T_1)^2); & T_2 < t < T_3
\end{aligned}$$

where $T_1 = pw$ which is the pulse width.

Figure 4:
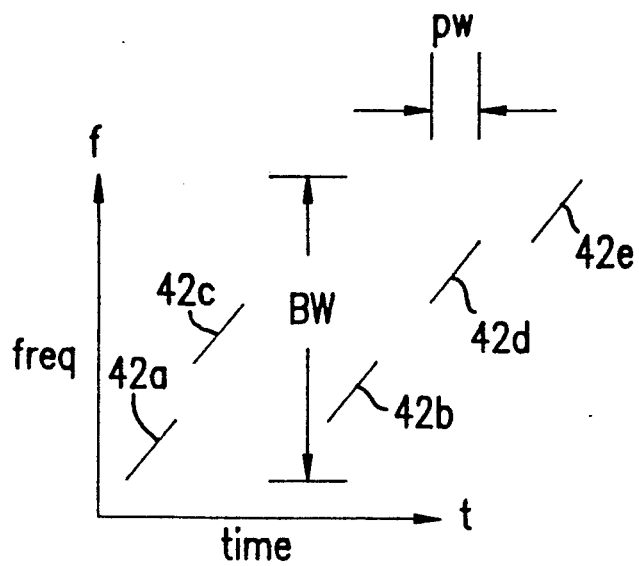
FIG. 4 shows a second variation of outputted chirp sub-pulses generated by the coherently interruptible frequency hopped chirp waveform network of FIG. 1.

The network in FIG. 1 can also output the sub-pulses as indicated in FIG. 4 in which the sub-pulses 42a through 42e can be randomized so that subsequent pulses jump or drop in frequency from previously generated sub-pulses.

Obviously, numerous modifications and variations of the present invention are possible in light of the above teachings. For example, the single-sideband mixing means in the network shown in FIG. 1 could be replaced with two mixers, a hybrid combiner, and a 90 degree hybrid to provide the quadrature outputs. It could also be replaced by a single mixer, filter, and 90 degree hybrid. The network used would be a function of application specific need, such as size, weight, bandwidth, or the frequency involved. It is therefore to be understood that within the scope of the appended claims, the invention may be practiced otherwise than as specifically described herein.

What is claimed is:

1. A circuit comprising:
   synthesizing means for generating fixed frequency signals;
   chirp generating means for generating chirp signals from a digital memory storing a chirp signal sample; and
   chirp sub-pulse generating means responsive to the fixed frequency signals and the chirp signals for generating a plurality of coherently interruptible and frequency selectable chirp sub-pulses.

2. The circuit of claim 1 wherein said chirp sub-pulse generating means comprises:
   a reference clock connected to said synthesizing means and said chirp generating means so that the fixed frequency signals generated by said synthesizing means and the chirp signals generated by said chirp generating means are phase locked to said reference clock.

3. The circuit of claim 2 wherein said chirp sub-pulse generating means further comprises:
   mixing means for mixing the chirp signals with the fixed frequency signals forming frequency translated chirp signals;
   timing and control means for controlling the frequency of the fixed frequency signals generated by said synthesizing means and for controlling said chirp generating means to generate the chirp signals at selectable increments of time so that the fixed frequency signals and the chirp signals are phase matched at selectable increments of time;
   output means connected to said mixing means and responsive to said timing and control means for outputting the translated chirp signals in the form of a plurality of coherently interruptible and frequency selectable chirp sub-pulses.

4. The circuit of claim 3 wherein said mixing means comprises:
   a plurality of power splitters connected to said synthesizer means and said chirp generating means;
   a plurality of mixers connected to said plurality of power splitters;
   a plurality of hybrid couplers connected to said mixers.

5. The circuit of claim 3 wherein said mixing means is a single sideband mixing means.

6. The circuit of claim 1 wherein said chirp generating means comprises:
   a digital memory for storing a chirp signal sample;
   at least one digital-to-analog converter connected to said digital memory;
   a counter responsive to said chirp sub-pulse generating means for initiating said digital memory to output the chirp signal sample.

7. The circuit of claim 1 wherein the combination of said synthesizing means, said chirp generating means, and said chirp sub-pulse generating means outputs the plurality of coherently interruptible and frequency selectable chirp sub-pulses according to the following criterion:

$$s(t) = A_j \sin(\omega_j(t - B_j) + \psi(t - B_j)^2); T_j < t < T_{j+1}$$

wherein;
   s(t) is the outputted translated chirp signal,
   j counts the sub-pulses,
   $A_j$ is the amplitude of the $j^{th}$ subpulse,
   t is time in seconds, $\psi$ is the ramp rate in radians per second per second,
   $T_{inc} = \pi/\psi$ is the time between zero crossings,
   $i_j$ is a set of integers,
   $T_j$ is equal to $i_j \cdot T_{inc}$,
   $n_j$ is a set of integers,
   $B_j$ is equal to $n_j \cdot T_{inc}$,
   $m_j$ is a set of integers,
   $\omega_j = 2\pi m_j / T_{inc}$ is the radian frequency of said synthesizing means 2 on the $j^{th}$ sub-pulse.

8. The circuit of claim 1 wherein said sub-pulse generating means interrupts the plurality of chirp sub-pulses at zero crossings.

9. A circuit comprising:
   synthesizing means for generating fixed frequency signals;
   chirp generating means for generating chirp signals from a digital memory storing a chirp signal sample;
   mixing means for mixing the chirp signals with the fixed frequency signals forming translated chirp signals;
   output means connected to said mixing means;
   timing and control means for controlling the frequency of the fixed frequency signals generated by said synthesizing means, and for controlling said chirp generating means to generate the chirp signals stored in the digital memory at selectable increments of time and at selectable points in the memory so that the fixed frequency signals and the chirp signals are phase matched at selectable increments of time, and for controlling said output means to output the translated chirp signals in the form of a plurality of coherently interruptible and frequency selectable chirp sub-pulses.

10. The circuit of claim 9 wherein the combination of said synthesizing means, said chirp generating means, said mixing means, said output means, and said timing and control means outputs the plurality of coherently interruptible and frequency selectable chirp sub-pulses according to the following criterion:

$$s(t) = A_j \sin(\omega_j(t - B_j) + \psi(t - B_j)^2); T_j < t < T_{j+1}$$

wherein;
   s(t) is the outputted translated chirp signal,
   j counts the sub-pulses,
   $A_j$ is the amplitude of the $j^{th}$ subpulse,
   t is time in seconds,
   $\psi$ is the ramp rate in radians per second per second,
   $T_{inc} = \pi/\psi$ is the time between zero crossings,
   $i_j$ is a set of integers,
   $T_j$ is equal to $i_j \cdot T_{inc}$,
   $n_j$ is a set of integers,
   $B_j$ is equal to $n_j \cdot T_{inc}$, $m_j$ is a set of integers,
$\omega_j = 2\pi m_j/T_{inc}$ is the radian frequency of said synthesizing means 2 on the $j^{th}$ sub-pulse.

11. A coherently interruptible frequency hopped chirp waveform generator comprising:
   a reference clock;
   synthesizing means responsive to said reference clock for generating quadrature fixed frequency signals;
   chirp generating means locked onto said reference clock for generating quadrature chirp signals from a digital memory storing a quadrature chirp signal sample;
   mixing means for mixing the quadrature fixed frequency signals with the quadrature chirp signals forming translated quadrature chirp signals;
   timing and control means phase locked onto said reference clock for adjustably controlling the frequency of the quadrature fixed frequency signals generated by said synthesizing means and for controlling said chirp generating means to selectively generate the quadrature chirp signals from various read points in the digital memory at selectable increments of time so that the quadrature fixed frequency signals and the quadrature chirp signals are phase matched and frequency selectable; and
   output means connected to said mixing means and responsive to said timing and control means for outputting the mixed quadrature chirp signals in the form of a plurality of coherently interruptible and frequency selectable chirp sub-pulses.

12. The circuit of claim 9 wherein the combination of said reference clock, means, said synthesizing means, said chirp generating means, said mixing means, said timing and control means, and said output means, outputs the plurality of coherently interruptible and frequency selectable chirp sub-pulses according to the following criterion:

$$s(t) = A_j \sin(\omega_j(t-B_j) + \psi(t-B_j)^2); T_j < t < T_{j+1}$$

wherein;
   s(t) is the outputted translated chirp signal,
   j counts the sub-pulses,
   $A_j$ is the amplitude of the $j^{th}$ subpulse,
   t is time in seconds,
   $\psi$ is the ramp rate in radians per second per second,
   $T_{inc} = \pi/\psi$ is the time between zero crossings,
   $i_j$ is a set of integers,
   $T_j$ is equal to $i_j \cdot T_{inc}$,
   $n_j$ is a set of integers,
   $B_j$ is equal to $n_j \cdot T_{inc}$,
   $m_j$ is a set of integers,
   $\omega_j = 2\pi m_j/T_{inc}$ is the radian frequency of said synthesizing means 2 on the $j^{th}$ sub-pulse.

* * * * *